(12) United States Patent
Scott et al.

(10) Patent No.: US 10,417,515 B2
(45) Date of Patent: Sep. 17, 2019

(54) CAPTURING ANNOTATIONS ON AN ELECTRONIC DISPLAY

(71) Applicant: Microsoft Technology Licensing, LLC, Redmond, WA (US)

(72) Inventors: James Scott, Cambridge (GB); Stephen Edward Hodges, Cambridge (GB); Nicholas Yen-Cherng Chen, Cambridge (GB); Stuart Alastair Taylor, Cambridge (GB); John Franciscus Marie Helmes, Steyl (NL); Tobias Grosse-Puppendahl, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 110 days.

(21) Appl. No.: 15/402,222

(22) Filed: Jan. 9, 2017

(65) Prior Publication Data
US 2018/0197034 A1     Jul. 12, 2018

(51) Int. Cl.
*G06K 9/00*     (2006.01)
*G06K 9/32*     (2006.01)
(Continued)

(52) U.S. Cl.
CPC ......... *G06K 9/3266* (2013.01); *G06F 3/0425* (2013.01); *G06F 17/241* (2013.01);
(Continued)

(58) Field of Classification Search
CPC . G06F 17/241; G06F 3/0425; G06K 9/00442; G06K 9/2018; G06K 9/3266;
(Continued)

(56) References Cited

U.S. PATENT DOCUMENTS 7,913,162 B2 *   3/2011   Hansen ................. G06F 17/241
                                                            715/230
8,971,568 B1     3/2015   Smits
(Continued)

FOREIGN PATENT DOCUMENTS

WO       9534881 A1    12/1995

OTHER PUBLICATIONS

"Sign Pro PDF", Retrieved from http://signature.wacom.eu/products/software/sign-pro-pdf/, Mar. 2, 2014, 3 Pages.
(Continued)

*Primary Examiner* — Tom Y Lu (57) ABSTRACT

A system is described which comprises an electronic display device, an annotation capture module and a camera. The annotation capture module is configured to trigger a change in an image displayed on the electronic display device responsive to a capture trigger and the camera is configured to capture one or more images of the electronic display device in response to the capture trigger and/or a trigger received from the annotation capture module. The annotation capture module is further arranged to identify any manual annotations made by a user on the electronic display device by analyzing the images of the electronic display device captured by the camera, wherein at least one of the images was captured after the change in the image displayed.

20 Claims, 5 Drawing Sheets

(51) Int. Cl.
G06F 17/24 (2006.01)
G06K 9/20 (2006.01)
G06F 3/042 (2006.01)
G06T 7/00 (2017.01)
G06T 7/254 (2017.01)

(52) U.S. Cl.
CPC ....... *G06K 9/00442* (2013.01); *G06K 9/2018* (2013.01); *G06T 7/00* (2013.01); *G06T 7/254* (2017.01); *G06T 2207/30176* (2013.01)

(58) Field of Classification Search
CPC .. G06T 2207/30176; G06T 7/00; G06T 7/254
See application file for complete search history.

(56) References Cited

U.S. PATENT DOCUMENTS

| | | | |
|---|---|---|---|
| 2005/0289452 | A1 | 12/2005 | Kashi et al. |
| 2006/0291727 | A1 | 12/2006 | Bargeron |
| 2008/0168073 | A1 | 7/2008 | Siegel et al. |
| 2010/0278453 | A1 | 11/2010 | King |
| 2011/0122156 | A1* | 5/2011 | Tanaka ............ G06F 3/14 345/660 |
| 2011/0128825 | A1* | 6/2011 | Tanaka ............ G06F 3/147 368/29 |
| 2011/0261030 | A1 | 10/2011 | Bullock |
| 2012/0032925 | A1 | 2/2012 | Sekiya |
| 2012/0229440 | A1 | 9/2012 | Rao et al. |
| 2014/0118306 | A1 | 5/2014 | Moses et al. |
| 2014/0164900 | A1 | 6/2014 | Zeng et al. |
| 2015/0124178 | A1* | 5/2015 | Khan ............ G02F 1/13338 349/12 |
| 2015/0310831 | A1 | 10/2015 | Candelore |
| 2015/0378664 | A1 | 12/2015 | Colmagro et al. |
| 2016/0210098 | A1 | 7/2016 | Landau et al. |

OTHER PUBLICATIONS

Starr, Michelle, "Sony Quietly Starts Selling Digital Paper E Ink Tablet Online", Retrieved from https://www.cnet.com/news/sony-quietly-starts-selling-digital-paper-e-ink-tablet-online/, Aug. 28, 2014, 8 Pages.
Marshall, Catherine C., "Toward an Ecology of Hypertext Annotation", In Proceedings of the 9th ACM Conference on Hypertext and Hypermedia, Jun. 20, 1998, 10 Pages.
"Your Workload Just Got Lighter", Retrieved from https://web.archive.org/web/20140330035932/http://pro.sony.com/bbsc/ssr/show-digitalpaper/resource.solutions.bbsccms-assets-show-digitalpaper-digitalpaper.shtml, Mar. 30, 2014, 4 Pages.
Agrawala, et al., "DIZI: A Digital Ink Zooming Interface for Document Annotation", In Proceedings of the 10th International Conference on Human-Computer Interaction, Sep. 12, 2005, 13 Pages.
Bringay, et al., "Annotations: A New Type of Document in the Electronic Health Record", In Proceedings of the Second International Conference on Document Research and Development in Sciences, Arts and Business: DOCAM., Oct. 2004, 15 Pages.
Chang, et al., "A Negotiation Architecture for Fluid Documents", In Proceedings of the 11th Annual ACM Symposium on User Interface Software and Technology, Nov. 1, 1998, 10 Pages.
Cockburn, et al., "Faster Document Navigation with Space-Filling Thumbnails", In Proceedings of the SIGCHI Conference on Human Factors in Computing Systems, Apr. 22, 2006, 10 Pages.
Golovchinsky, et al., "From Reading to Retrieval: Freeform Ink Annotations as Queries", In Proceedings of the 22nd Annual International ACM SIGIR Conference on Research and Development in Information Retrieval, Aug. 1, 1999, 7 Pages.
Golovchinsky, et al., "Moving Markup: Repositioning Freeform Annotations", In Proceedings of the 15th Annual ACM Symposium on User Interface Software and Technology, Oct. 27, 2002, 9 Pages.
Guiard, Yves, "Asymmetric Division of Labor in Human Skilled Bimanual Action: The Kinematic Chain as a Model", In Journal of Motor Behavior, vol. 19, Issue 4, Dec. 1, 1987, 26 Pages.
Hinckley, et al., "Design and Analysis of Delimiters for Selection-Action Pen Gesture Phrases in Scriboli", In Proceedings of the SIGCHI Conference on Human Factors in Computing Systems, Apr. 2, 2005, 10 Pages.
Hinckley, et al., "Informal Information Gathering Techniques for Active Reading", In Proceedings of the SIGCHI Conference on Human Factors in Computing Systems, May 5, 2012, 4 Pages.
Hinckley, et al., "Pen+Touch=New Tools", In Proceedings of the 23nd annual ACM Symposium on User Interface Software and Technology, Oct. 3, 2010, 10 Pages.
Klemmer, et al., "The Designers' Outpost: A Tangible Interface for Collaborative Web Site Design", In Proceedings of the 14th Annual ACM Symposium on User Interface Software and Technology, Nov. 11, 2001, 9 Pages.
Marshall, Catherine C., "Annotation: From Paper Books to the Digital Library", In Proceedings of the second ACM international conference on Digital libraries, Jul. 1, 1997, 10 Pages.
"International Search Report and Written Opinion Issued in PCT Application No. PCT/US17/067151", dated Apr. 20, 2018, 11 Pages.
Pearson, et al., "Improving Annotations in Digital Documents", In Proceedings of 13th European Conference on Digital Libraries, Sep. 27, 2009, 4 Pages.
Pearson, et al., "The Reading Desk: Applying Physical Interactions to Digital Documents", In Proceedings of SIGCHI Conference on Human Factors in Computing Systems, May 7, 2011, 4 Pages.
Sellen, et al., "The Myth of the Paperless Office", In Publication of the MIT Press, Feb. 28, 2003, 8 Pages.
Song, et al., "Grips and Gestures on a Multi-Touch Pen", In Proceedings of SIGCHI Conference on Human Factors in Computing Systems, May 7, 2011, 10 Pages.
Tashman, et al., "LiquidText: A Flexible, Multitouch Environment to Support Active Reading", In Proceedings of SIGCHI Conference on Human Factors in Computing Systems, May 7, 2011, 10 Pages.
Vogel, et al., "Occlusion-Aware Interfaces", In Proceedings of SIGCHI Conference on Human Factors in Computing Systems, Apr. 10, 2010, 10 Pages.
Wellner, Pierre, "Interacting with the Paper on the Digital Desk", In Communications of the ACM—Special Issue on Computer Augmented Environments: Back to the Real World, vol. 36, Issue 7, Jul. 1, 1993, 10 Pages.
Yoon, et al., "TextTearing: Expanding Whitespace for Digital Ink Annotation", In Proceedings of Annual ACM Symposium on User Interface Software and Technology, Oct. 8, 2013, 6 Pages.
Zeleznik, et al., "Hands-On Math: A Page-Based Multi-Touch and Pen Desktop for Technical Work and Problem Solving", In Proceedings of 23nd Annual ACM Symposium on User Interface Software and Technology, Oct. 3, 2010, 10 Pages.

* cited by examiner

CAPTURING ANNOTATIONS ON AN ELECTRONIC DISPLAY

BACKGROUND

Hand annotation of documents or drawings is a very natural action and even though on-screen annotation is possible in some software applications using keyboard input and on some tablet computing devices using a special pen which is sensed by the tablet, many people still choose to hand annotate paper printouts due to their low weight, low cost and ease of carrying around and passing to others. However, people then face the difficulty of incorporating the hand annotations back into electronic versions of documents.

The embodiments described below are not limited to implementations which solve any or all of the disadvantages of known methods of hand annotation.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A system is described which comprises an electronic display device, an annotation capture module and a camera. The annotation capture module is configured to trigger a change in an image displayed on the electronic display device responsive to a capture trigger and the camera is configured to capture one or more images of the electronic display device in response to the capture trigger and/or a trigger received from the annotation capture module. The annotation capture module is further arranged to identify any manual annotations made by a user on the electronic display device by analyzing the images of the electronic display device captured by the camera, wherein at least one of the images was captured after the change in the image displayed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, despite technology being available to allow people to annotate electronic copies of documents on-screen (e.g. using keyboard input or a special pen which is sensed by the display), many people still prefer to manually annotate (i.e. annotate by hand using a pen/pencil) printed versions of documents. This manual (or hand) annotation may be referred to as 'inking'. There are many reasons for such a preference for manual annotation and these include the ease/simplicity of the annotation process, i.e. a user can just pick up a pen and annotate without having to learn or run special software or special tools within a software application. Also, the paper printouts are themselves light and easy to carry around and do not require a power supply. This makes hand annotation something which is easily performed at any time (e.g. whether at the home or office or whilst away from the home or office).

Electronic paper displays (which may also be referred to as persistent displays) share many of the qualities of a paper printout, in that they can be light, easy to carry around and do not require a power supply to display an image (only to change the image displayed). However, whilst it is possible to integrate an electronic paper display with a sensing array to enable inking on the electronic paper display using a special (e.g. active) pen, this adds considerably to the size and weight of the device, may be limited in functionality (e.g. limited in terms of the resolution compared to that achievable by the human hand with a pen and/or stroke thicknesses available) and requires a power supply. Furthermore, as the update speed of an electronic paper display is relatively slow (e.g. compared to an emissive display), there is a visible delay between a user making a pen stroke and the corresponding mark appearing on the electronic paper display. This results in a poor user experience.

Described herein is a system for capturing temporary manual annotations on an electronic display, i.e. annotations which are drawn manually by a user using an erasable ink pen such as a dry-wipe marker (or other passive marking implement which can be erased or otherwise wiped off, such as a crayon or chinagraph pencil) onto the surface of the electronic display or are drawn onto a sticky note (or other removable note) using an ink pen (or other passive marking implement, such as a crayon or chinagraph pencil) and then the sticky note is attached to the surface of the electronic display. The ink annotations (which in many examples cannot be detected by the electronic display) are captured using a camera and as described in more detail below one or more images or a video sequence is captured in response to a capture trigger (e.g. a user input). Software, which may run on the camera, the electronic display or on another computing device, changes the image which is displayed on the electronic display in response to the capture trigger (e.g. before an image is captured) and this improves the quality of the annotation capture process. As a consequence of the use of a camera and in some implementations the change that is made to the image in response to the capture trigger, the ink annotations may be captured at high resolution (e.g. at a resolution which is comparable to the resolution achievable by the human hand with a pen) and different colors of pen can be distinguished and/or different thicknesses of markings can be identified and captured.

Having captured one or more images using the camera 104 (at least one of which is captured after the image displayed has been changed), the captured images can be processed to extract the annotations and the annotations may be stored on their own and/or they may be incorporated into whatever content was displayed at the time the annotations were made and the combination of the content and the annotations may be stored. The annotated content may then be displayed back on the electronic display device, which allows the user to erase their temporary ink and retain the annotations both locally and in the electronic version of the document. In various examples, if the document is shown in more than one location (e.g. on more than one display, where the two displays may be geographically separated), either synchronously or asynchronously, this has the effect of enabling the act of annotation to have a remote action.

The term 'electronic paper' is used herein to refer to display technologies which reflect light (like paper) instead of emitting light like conventional LCD displays. As they are reflective, electronic paper displays do not require a significant amount of power to maintain an image on the display and so may be described as persistent displays. A multi-stable display is an example of an electronic paper display. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term 'multi-stable display' is used herein to describe a display which comprises pixels that can move between two or more stable states (e.g. a black state and a white state and/or a series of grey or colored states). Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a 'persistent display' or 'persistently stable' display. In the examples described below the display device comprises an electrophoretic ink layer which is an example of a multi-stable layer which can be changed (or controlled) by applying electric fields. This is described by way of example and the electrophoretic ink layer may alternatively be replaced by a different multi-stable layer, such as a cholesteric liquid crystal layer or a bi-stable electrowetting display layer which is controlled using electric fields or currents applied via electrodes on the faces of the layer.

Figure 1:
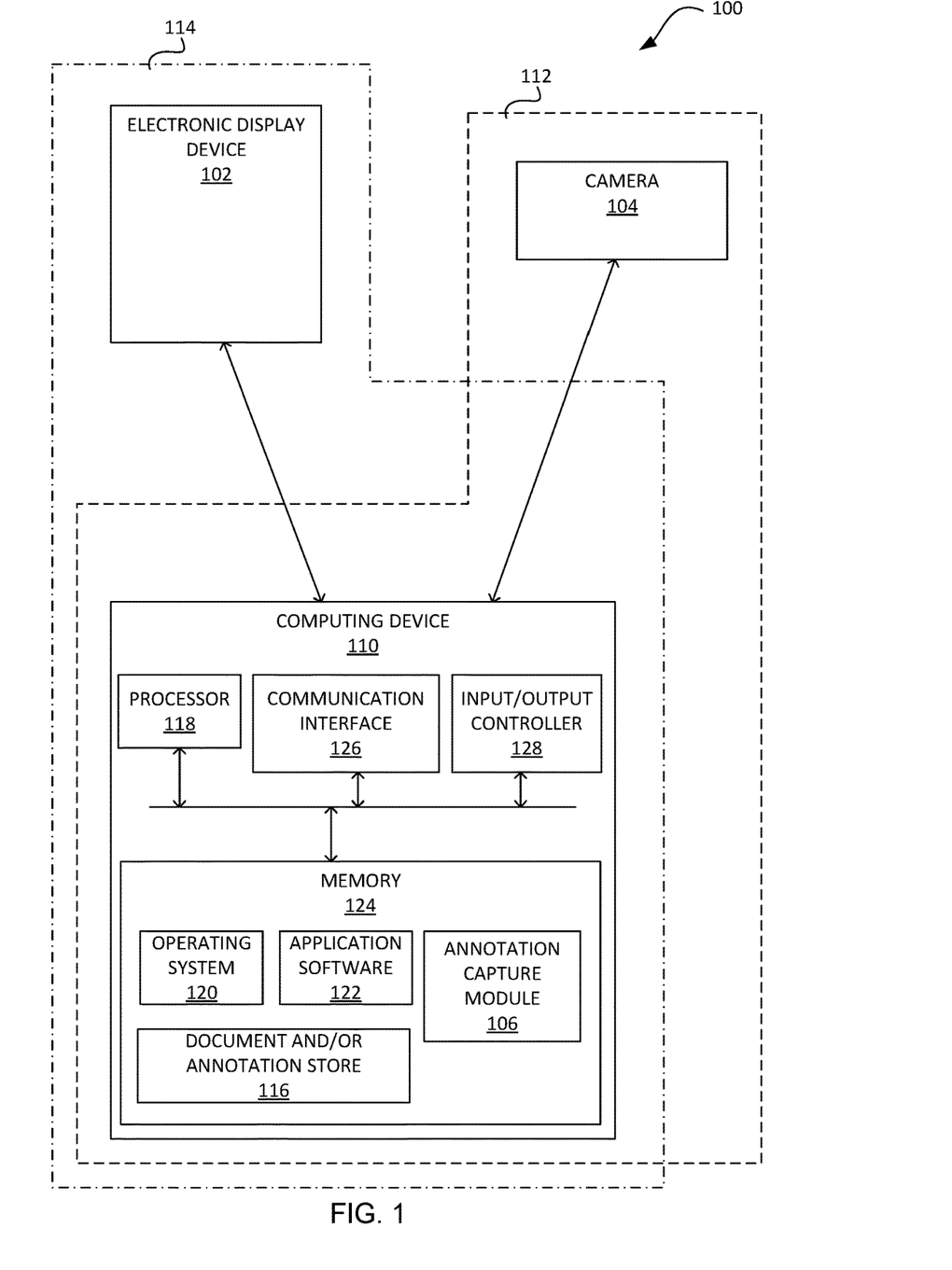
FIG. 1 is a schematic diagram of an example system for capturing ink annotations on an electronic display.

FIG. 1 is a schematic diagram of an example system for capturing manual annotations on an electronic display. The system 100 comprises an electronic display device 102, a camera 104 and an annotation capture module 106. In some examples the annotation capture module 106 (which may be implemented in software, as shown in FIG. 1, or hardware, or a combination of hardware and software) may be implemented in a separate device, e.g. computing device 110 as shown in FIG. 1. In other examples, the annotation capture module 106 and camera 104 may be integrated into the same device, as indicated by the dotted outline 112 and this device 112 may, for example, be a portable computing device (such as a smart phone or tablet computer comprising an emissive or an electronic paper display) or a fixed device (e.g. a hub device for use with Skype® or other collaborative working solution). In further examples, the annotation capture module 106 and the electronic display device 102 may be integrated into the same device, as indicated by the dotted outline 114 (e.g. a desk surface with an integrated electronic display device).

The electronic display device 102 may comprise an emissive display or an electronic paper display and may be of any size (e.g. small and portable to large fixed installations, such as whiteboard or wall sized electronic display devices). In examples where the electronic display device 102 comprises electronic paper display, no power is required to maintain an image on the display, but instead power is only required to change that image. This may enable the electronic display device 102 to be lighter and thinner than an emissive display and in various examples, the electronic display device 102 may be flexible. The use of an electronic paper display may also be more scalable than an emissive display (e.g. where the display extends across an entire wall of a room) because the power requirements are less than emissive displays, no backlight is required, regions can be updated iteratively and it is not necessary to achieve ultra-high speeds to update the display. The camera 104 may operate in the visible wavelengths and/or may operate in the infra-red (e.g. it may comprise an infra-red flash and photodetectors which are responsive to infra-red wavelengths). As described above, the camera 104 may be a standalone device or may be integrated into a computing device such as a smart phone, tablet computer, games console, etc.

The annotation capture module 106 (or the device in which the annotation capture module 106 is incorporated) is arranged to communicate with at least the camera 104 and in various examples with both the electronic display 102 and the camera 104, although the annotation capture module 106 may communicate over links of different characteristics with the electronic display 102 and camera 104 (e.g. the communication with the electronic display 102 may use any low-bandwidth mechanism, whereas the communication with the camera 104 is of sufficient bandwidth to transfer captured images from the camera 104 to the annotation capture module 106). The operation of the annotation capture module 106 can be described with reference to FIGS. 2 and 3.

Figure 2:
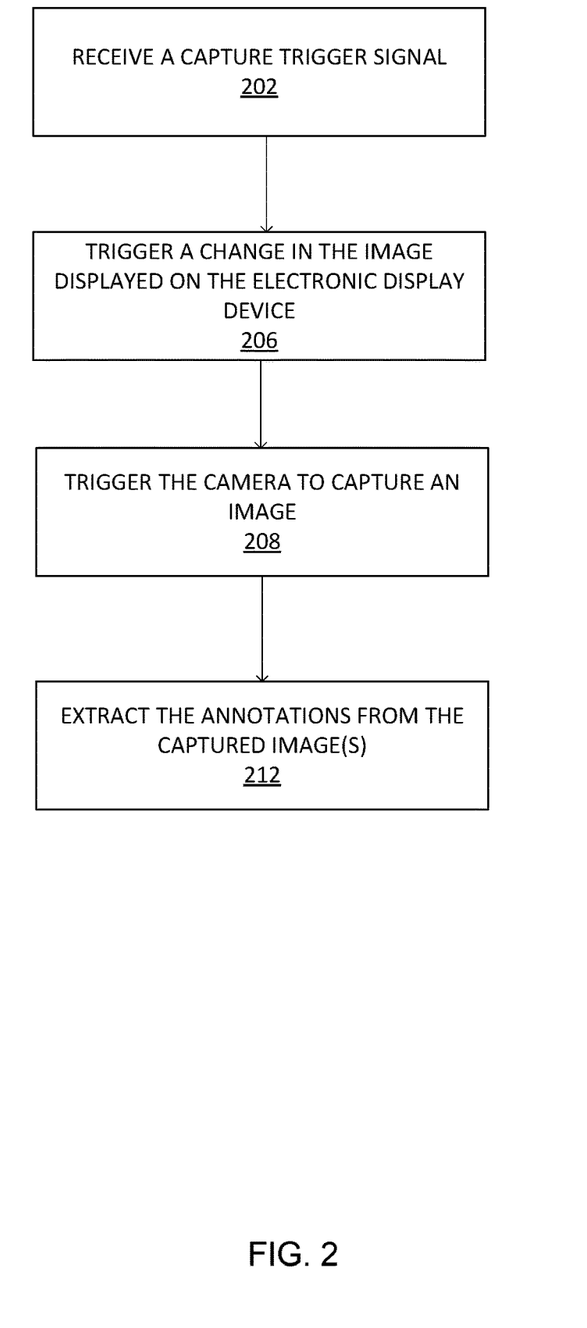
FIG. 2 is a flow diagram showing a first example method of operation of the annotation capture module in the system shown in FIG. 1.
Figure 3:
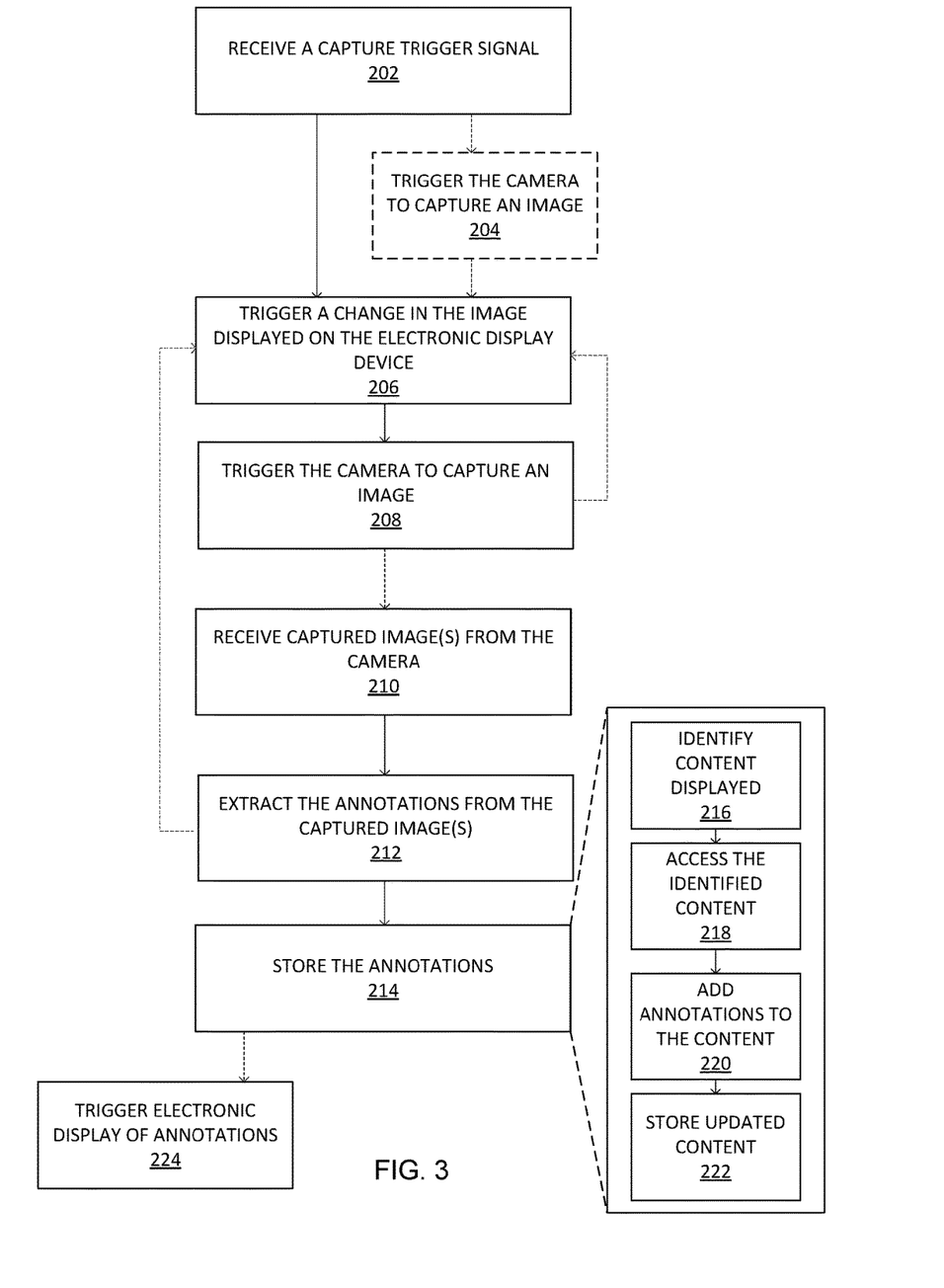
FIG. 3 is a flow diagram showing a second example method of operation of the annotation capture module in the system shown in FIG. 1.

The method starts with the receipt of a capture trigger signal (block 202) where this signal may be generated in response to a user input (e.g. a user pressing a capture button on the electronic display 102, the camera 104 or in an application running on the computing device 110) or may be generated by software which detects that manual annotation has finished (e.g. computer vision software operating in the camera 104 or computing device 110 or sensing software operating in the electronic display device 102).

As shown in FIGS. 2 and 3, in response to receiving the capture trigger signal (in block 202), the annotation capture module 106 triggers a change in the image displayed on the electronic display device (block 206), e.g. by triggering the sending of updated display data to the electronic display device 102. There are many ways in which the image can be changed in response to the trigger and various examples are described below. Having triggered the change in the image displayed on the display device (in block 206), the annotation capture module 106 triggers the camera to capture one or more images (block 208). In various examples the annotation capture module 106 may repeatedly trigger a change in the content displayed on the electronic display device 102 followed by triggering image capture by the camera 104 (as indicated by the dotted arrow from block 208 to block 206 in FIG. 3). In other examples, the change of image that is triggered (in block 206) may be a sequence of changes of image, i.e. a single trigger which causes a sequence of updates to the displayed image (e.g. wipe to black, wipe to white, restore original content that was displayed) and the camera 104 may capture a sequence of images either as a consequence of a single trigger (in block 208) or multiple triggers (e.g. in repeated instances of block 208). As also shown in FIG. 3, in some examples, the camera 104 may be triggered to capture an image (block 204) before triggering a change in the image displayed (in block 206).

Having triggered the camera to capture one or more images (in block 208 and optionally in block 204), these captured images are received (block 210) by the annotation capture module 106 or by a separate annotation processing module (not shown in FIG. 1). The annotations are extracted from the received image(s) (block 212), by the annotation capture module 106, by analyzing the image(s), for example, using computer vision techniques (e.g. 3D rotation) and followed by post-processing to remove the background (e.g. to subtract known content from the captured image). As shown in FIG. 3, the extracted annotations may then be stored (block 214).

The extraction of the annotations (in block 212) by analyzing the received image(s) may comprise one or more of:

Correcting for the pose angle of the electronic display device 102 relative to the camera 104 (e.g. 3D rotation)

Estimating the lighting conditions using a stored reference image of the electronic display device 102 displaying a reference image (or an entirely black/white display), where, in response to the trigger in block 206 the electronic display device 102 displays the reference image Correcting for lighting conditions, such as shadows, dimly or brightly lit conditions, etc. (where the lighting conditions may be estimated using the method above or any other method)

Estimating and subtracting the background content (e.g. resulting in an image showing the annotations only)

Removing reflections by using multiple angles (e.g. with a single movable camera or multiple cameras)

Extracting vector-based image data from the pixel image

As described above, the annotations may be stored separately from any content that was displayed on the display device 102 at the time the capture trigger was received (in block 202) and/or the annotations may be combined into the content which was displayed at the time that the original trigger was received (in block 202), e.g. to generate a new version of the content, and the updated content may be stored (in block 214).

The annotations which are captured (in the images captured by the camera) and extracted by the annotation capture module 106 (in block 212) are temporary (i.e. removable) manual annotations made by a user on the electronic display device 102. As described above, these annotations may be applied manually to the surface of the electronic display device 102 by a user using an erasable ink pen (e.g. a dry-wipe marker) or other passive marking implement which can be erased or otherwise wiped off the surface of the electronic display device 102, such as a crayon, chinagraph pencil, ink stamp etc. The annotations may be drawn or stamped directly onto the surface of the electronic display or may be drawn onto a piece of paper (e.g. a sticky note) or sticker which is then stuck to the surface of the electronic display sticky note. The annotations that are captured are removable from the surface of the electronic display 102, e.g. by erasing the annotations (e.g. by rubbing off the ink, wax or other marking medium) or peeling off the piece(s) of paper which have been stuck to the surface of the electronic display 102.

In various examples the marking medium (e.g. ink or wax) may be reflective to light which is outside the human-visible spectrum, such as in the infra-red (IR) range of wavelengths, in a different way to the underlying structure of the electronic display device (e.g. the underlying structure may not reflect the part of the non-visible spectrum used). By using a camera 104 with a flash that contains at least some light in a part of the non-visible spectrum (e.g. IR) and which can detect light of the same wavelength (i.e. the part of the non-visible spectrum emitted by the flash), the annotations may be captured in an image separately from the content displayed on the electronic display device 102 which does not reflect the non-visible light in the same way. In this way the annotations can be clearly distinguished from the content displayed without requiring significant image processing.

In various examples, the annotations which are captured and extracted by the annotation capture module 106 cannot be detected by the electronic display device 102. In other examples, the electronic display device 102 may be able to detect that an annotation has been made (e.g. where the electronic display device 102 comprises a touch-sensitive display); however, the method described herein may enable capture of annotations at a higher resolution than the touch-sensitive display.

Figure 4:
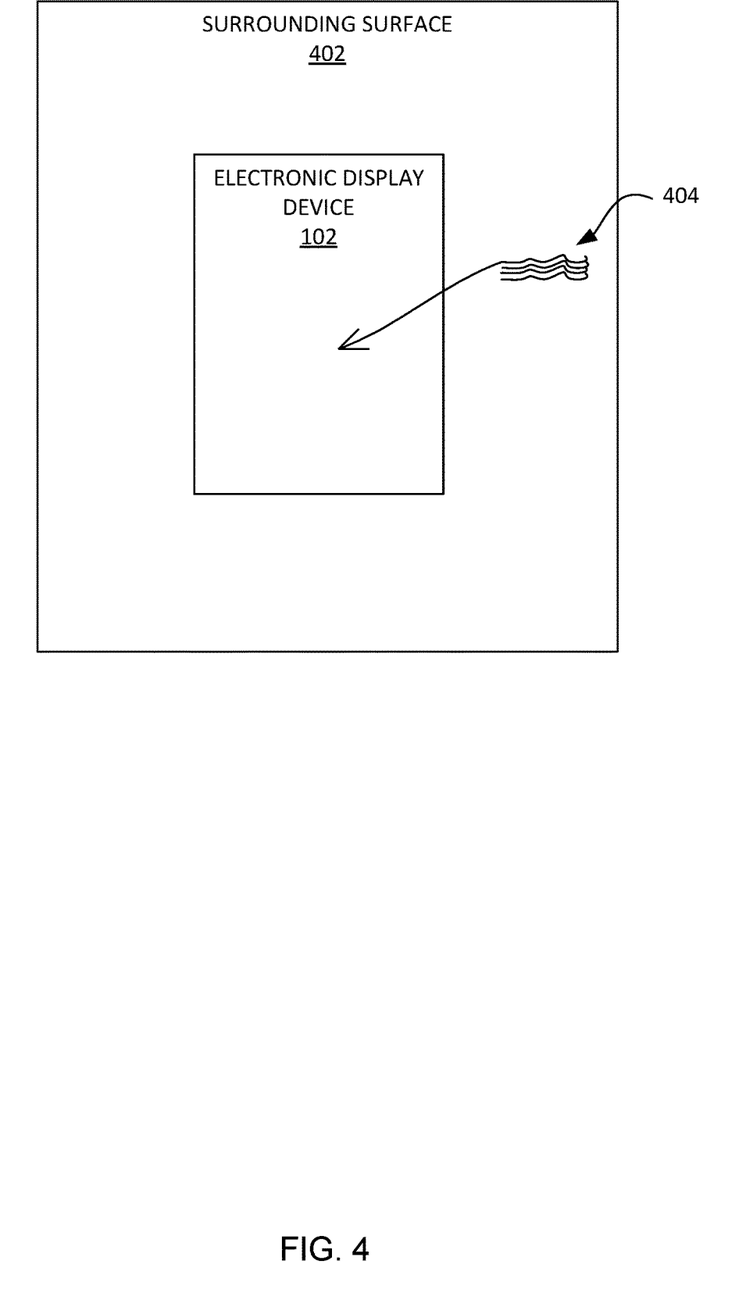
FIG. 4 is a schematic diagram showing a hybrid whiteboard comprising an electronic display device set within a larger surface.

The annotations which are captured and extracted by the annotation capture module 106 may, in various examples, extend beyond the edge of the electronic display device 102. This may, for example, provide a user with a larger area for providing annotations than is available on the electronic display device (e.g. particularly where the content displayed leaves little or no room for annotations) whilst still enabling the user to link the annotations to the displayed content. An example arrangement is shown in FIG. 4 in which the electronic display device 102 is positioned in or on a larger surface (e.g. such that the front face of the electronic display 102 is flush with the surrounding surface 402). In the example shown, the annotation 404 extends from the surface of the electronic display 102 onto the surrounding surface 402.

The changing of the image (which may also be referred to as the content) displayed on the electronic display device 102 (as triggered in block 206) improves the annotation extraction process (in block 212). In various examples, the changing of the image may improve the accuracy (or quality) of the annotation extraction, reduce the computational power required to perform the annotation extraction, identify the electronic display device (e.g. where there are multiple displays within the field of view of the camera) and/or assist in identifying the content currently being displayed on the electronic display device 102. Depending on the change made, the changing of the image may also provide user feedback (e.g. such that a user can identify that annotations on a display are being captured, and hence can be subsequently erased).

As described above, there are many different ways in which the image displayed can be changed prior to triggering the capture of an image. The change may be implemented by changing the color of one or more pixels and/or changing the frontlight and/or backlight of the display. Examples of the changes that may be made include:

- Erasing the image displayed, e.g. such that in a subsequently captured image (as triggered in block 208) the annotations are visible separate from whatever content was being displayed when the annotations were made
- Changing the image displayed to a screen which is entirely a single color (e.g. black, white or another color), e.g. such that annotations can be more clearly distinguished from the capture image(s) and/or shadows on the display, and/or to distinguish between annotations made in different colors
- Adding an identification feature, e.g. in the form of an alpha-numeric ID, a barcode or QR code, a bokode (which may be illuminated in response to the trigger signal), etc. where the feature may be visible to a human or may be invisible or may be barely noticeable to a human (e.g. a steganographic feature). The identification feature may identify the content that was displayed at the time of receipt of the original trigger (in block 202) or may identify the electronic display device 102 (e.g. and this may be used to identify the content or to distinguish between displays where there are multiple displays in the field of view of the camera 104).
- Adding an authentication feature, e.g. which may be used for one or more of: verifying that the annotation is permitted, assigning ownership of the annotation to the user ID of the user capturing them, enabling the subsequent updating of the content displayed on the display device and/or access to the content displayed on the display device at the time the capture trigger was received, etc.
- Adding a calibration or alignment feature, e.g. in the form of a checkerboard or concentric rings, such that the pose of the electronic display device 102 can be determined and this may be particularly useful where the display is flexible. The calibration/alignment feature may be used when processing the captured image to extract the annotations (in block 212) to correct for the pose of the electronic display device 102 relative to the camera 104.
- Blinking one or more pixels or otherwise adding a feature to identify the display to be captured, e.g. where there are multiple displays in the field of view of the camera
- Lighting up the regions of interest to guide the camera and achieve a higher resolution image Although the examples above are listed separately, a change to the displayed content may incorporate more than one of these examples (e.g. both an identification and a calibration feature may be displayed).

As described above, multiple changes to the image displayed may be triggered (e.g. in a single instance of block 206 or in multiple instances of block 206). For example, the content displayed may be erased by setting the display to be entirely white and then setting the display to be entirely black (or to black followed by white), before restoring the displayed content again. Images captured by the camera against the black/white background will only comprise the annotations and depending upon the color of the marking medium used, the annotations may be more clearly visible against one of the black and white backgrounds. Where the electronic display device 102 is a color display, it may cycle through a sequence of colors (e.g. through a sequence of common colors for marking media, such as red, green, blue and black) to enable annotations in different colors to be clearly distinguished from each other. In another example, the content displayed may be erased (to enable capture of the annotations without the background content) and then an identification feature may be displayed to enable the background content (which was annotated by the user) to be identified.

In various examples, the displayed content may always be restored after the capture of the image(s) by the camera (e.g. prior to or in parallel with block 210 in FIG. 3).

Having received the captured images (in block 210), the annotations are extracted from the received image(s) by analyzing the image(s), e.g. using image processing techniques, and then the extracted images may be stored (in block 214). In examples where the annotations are in different colors (e.g. using different color inks and/or different colored sticky notes), the annotations may be extracted and stored separately. For example, if the annotations are partially in red ink and partially in blue ink, the annotations in red may be stored separately from the annotations in blue. Alternatively, annotations in different colors may be stored together (e.g. along with the content that was displayed at the time that the capture was triggered) and they may be labeled (or otherwise tagged) to indicate that they were written in different colors.

In various examples, the storing of the annotations comprises adding them into the content that was displayed at the time that the capture was triggered. As shown in FIG. 3, this may comprise identifying the content that was displayed at the time that the capture was triggered (block 216), accessing that content (block 218), adding the annotations to the identified content (block 220) and storing the updated content with the added annotations (block 222). The content may be identified (in block 216) based on one or more features from the captured image(s). In various examples these features may be added to the displayed content in response to the trigger to change the image displayed (in block 206) and in other examples the feature(s) may be always displayed. In yet further examples, the document may be identified using pattern matching (e.g. between the image of the displayed content and a set of stored documents). In other examples, the content may be identified in another way, e.g. based on an identifier which is shared wireless by the electronic display device 102 with the computing device 110. The identified content may be accessed (in block 218) from a local data store 116 in the computing device 110 or alternatively the content may be accessed from a remote data store (e.g. from a cloud service or remote data center).

In examples where the annotations are added to the identified content (in block 220), the annotations may be added in the exact form in which they were captured or may be processed prior to being added. For example, optical character recognition (OCR) may be used to convert handwritten annotations into text which can be added into an electronic document. In another example, a handwritten annotation may be reduced in size or otherwise modified (without performing OCR) prior to adding it to the identified content (e.g. to correct hand-writing). The processing of the annotations may, for example, make the annotations larger, clearer, easier to read, easier to share, etc. In examples where multiple annotations are made over a period of time and/or are written in different colors, the separate annotations may be tagged to enable generation of a timeline of annotations (e.g. such that a user can roll back and replay annotations). It will also be appreciated that in examples where the annotations are stored separately and are not added to the identified content, the annotations may be processed in a similar manner.

Figure 5:
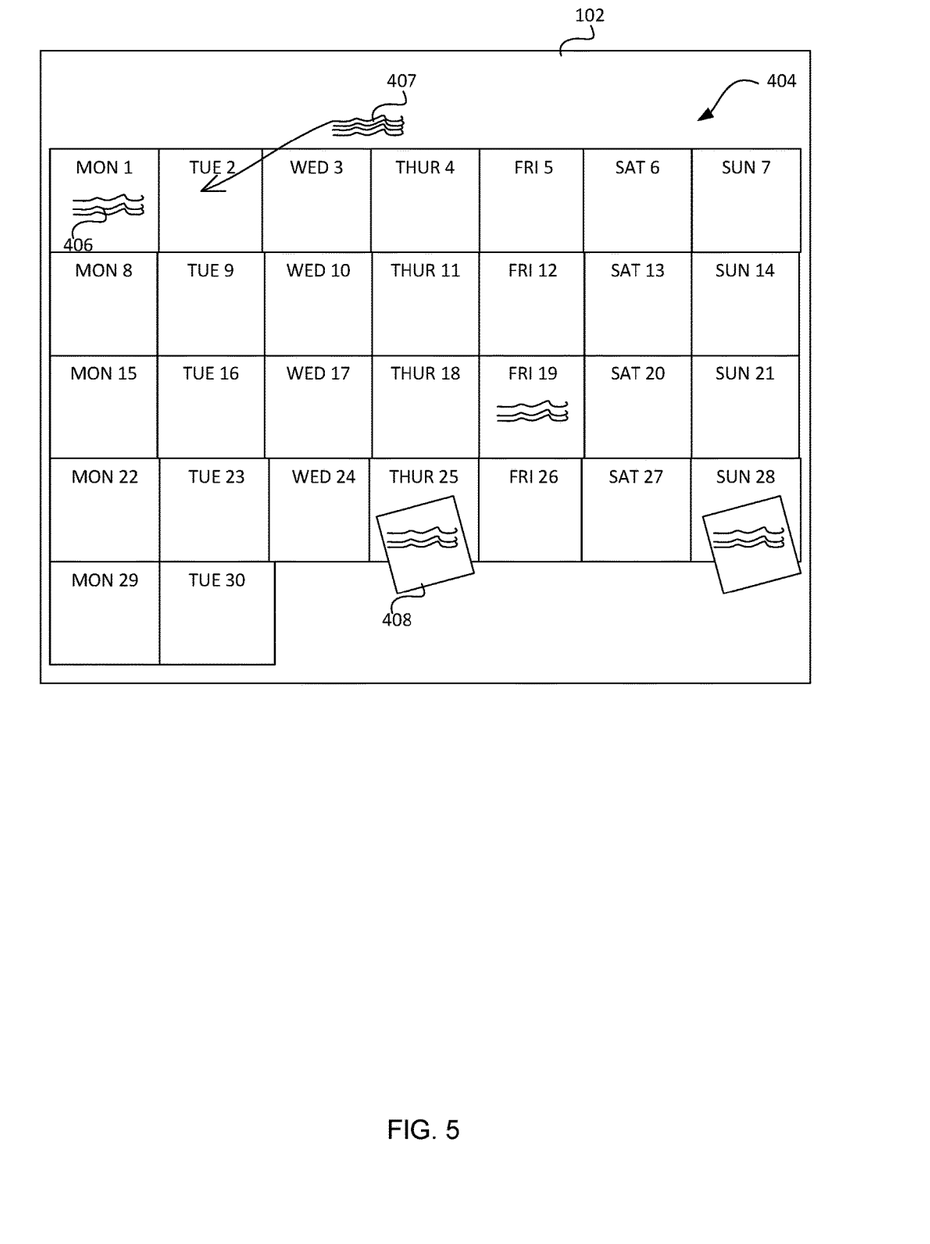
FIG. 5 is a schematic diagram showing manual annotations on a calendar which is rendered electronically on an electronic display device.

An example application is shown in FIG. 5. FIG. 5 shows a calendar 404 which is displayed on an electronic display device 102. A user can add entries to the calendar in the form of handwritten annotations 406, 407 directly on the display (e.g. either on the relevant day 406 or around the periphery 407 with an arrow or similar indicating which day the annotation relates to) or sticky notes 408 (with handwritten annotations on them).

In examples where the annotations are added into the identified content, the method may further comprise rendering the updated content on the electronic display device 102 (block 224). The annotations may also be rendered electronically on the display separately from any content and this may, for example, assist in collaborative working, e.g. such that the annotations can be seen more clearly. In yet further examples, what is rendered electronically may extend the annotations across the entire surface of the electronic display device 102 (e.g. a small pattern drawn on the surface of the electronic display device 102 may be replicated and tiled across the entire display area).

Although the methods shown in FIGS. 2 and 3 and described above show the camera 104 being triggered to capture an image responsive to a trigger signal generated by (and hence received from) the annotation capture module 106, in addition or instead the camera may capture an image responsive to the same trigger signal as is received by the annotation capture module 106 (in block 202). In various examples, the camera 104 may then capture a further image in response to a trigger signal received from the annotation capture module 106 (such that there is some synchronization between the changing of the image displayed and the capturing of images) or the camera may not be triggered by the annotation capture module 106 (such that there is no guarantee of synchronization between the changing of the image displayed and the capturing of images). In this latter scenario, the camera may capture a sequence of images in response to the original capture trigger signal (from block 202) and in this way, at least one of the captured images will be captured after the image displayed has been updated by the annotation capture module 106.

In the examples described above, the receipt of the captured images (in block 210) occurs after the last triggering event (in block 208); however, in other examples captured images may be received and annotations extracted earlier. In various examples, after each capture by the camera (as triggered in block 208), the captured image may be received almost immediately and the annotation processing (in block 212) may start before all the images are captured.

Although FIG. 3 shows the identification of content (in block 216) occurring after the extraction of the annotations (in block 212), in various examples, the content may be identified before the annotations are extracted and in some examples, the knowledge of the content displayed (as identified in block 216) may be used in the process of extracting the annotations (in block 212), e.g. by subtracting the known content from a received image.

In various examples, on receipt of a captured image, any annotations may be extracted and the quality of the extracted annotations assessed and if the quality is below a target value, then a further change to the display is triggered (in block 206) followed by triggering capture of a further image (in block 208), as indicated by the dotted arrow from block 212 to block 206 in FIG. 3. Any suitable quality metric may be used (e.g. the softness of the recognized edges on either the displayed background or the annotated region). This process may, for example be used to enable the minimum set of display changes to be triggered (and hence performed) whilst still capturing the annotations and this may be particularly useful in combination with an electronic paper display because of the additional power consumption associated with changing the image displayed compared to maintaining a static image on the display. For example, the annotation capture module 106 may trigger the electronic display device 102 to display an entirely white image, followed by triggering image capture. If the quality of the annotations extracted from an image showing the annotations against a white background is not sufficient (e.g. when assessed using a pre-defined quality metric and pre-defined target value), then the annotation capture module 106 may trigger the electronic display device 102 to display an entirely black image and the method may then be repeated.

The computing device 110 described above and shown in FIG. 1 comprises one or more processors 118 which are microprocessors, controllers or any other suitable type of processors for processing computer executable instructions to control the operation of the device in order to implement the method of FIG. 2 or FIG. 3. In some examples, for example where a system on a chip architecture is used, the processors 118 may include one or more fixed function blocks (also referred to as accelerators) which implement a part of the method of FIG. 2 or FIG. 3 in hardware (rather than software or firmware). Platform software comprising an operating system 120 or any other suitable platform software is provided at the computing device to enable application software 122 (which may include the annotation capture module 106) to be executed on the device.

The computer executable instructions are provided using any computer-readable media that is accessible by computing device 110. Computer-readable media includes, for example, computer storage media such as memory 124 and communications media. Computer storage media, such as memory 124, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 124) is shown within the computing device 110 it will be appreciated that the storage is, in some examples, distributed or located remotely and accessed via a network or other communication link (e.g. using communication interface 126).

Communication between the computing device 110 and the electronic display device 102 and the camera 104 may be via the communication interface 126 and/or an input/output controller 128. The input/output controller 128 may be arranged to output display information to the electronic display device 102 which may be separate from or integral to the computing device 110 (as described above). In various examples where the computing device 110 is separate from the electronic display device 102, the computing device 110 may comprise an additional display device and input/output controller 128 may be arranged to output display information to this integral display as well as to the separate electronic display device 102. The display information may provide a graphical user interface (GUI) and in various examples where the computing device 110 includes an integral display device, the GUI may include alignment features to assist a user in positioning the camera 104 when capturing the images. The input/output controller 128 may also be also arranged to receive and process input from one or more devices, such as the camera 104 or other user input device (e.g. a mouse, keyboard, microphone or other sensor). In some examples the camera or other user input device detects voice input, user gestures or other user actions and provides a natural user interface (NUI).

Any of the input/output controller 128, display device 102 and the camera 104 or other user input device (not shown in FIG. 1) may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

In various examples, the computing device 110 may be a smart phone or tablet computer and may include the camera 104 (as indicated by the dotted outline 112). In such examples, the computing device 110 comprises an integral display device which is separate and distinct from the electronic display device 102 on which the manual annotations are made. The annotation capture module 106 may be implemented as an application running on the smart phone or tablet computer or may be implemented within the operating system. In various examples, the integral display device may be used to display alignment features to assist the user in positioning the electronic display device 102 (and optional surrounding surface 402) within the field of view of the camera 104. The integral display device, which may be touch-sensitive, may also be used to display a capture button, which when pressed by the user causes the generation of the capture trigger signal which initiates the method of FIGS. 2 and 3.

In various examples, the camera 104 may be a fixed installation within a room and the computing device 110 may be integrated with the camera 104. This may, for example, be used to capture temporary manual annotations on a large wall-mounted or table-top electronic display device 102 (e.g. in a meeting room or other collaborative working space).

Although the present examples are described and illustrated herein as being implemented in a system as shown in FIG. 1, the system described is provided as an example and not a limitation. As those skilled in the art will appreciate, the present examples are suitable for application in a variety of different types of systems. Although FIG. 1 shows only a single camera 104, in other examples, there may be multiple cameras 104 (e.g. such that images can be captured at multiple different angles and these may, for example, be used to remove reflections or to capture annotations which are not visible in some images due to objects blocking line of sight). Furthermore, although the method stages examples are described and illustrated herein as being implemented in the sequence shown in FIGS. 2 and 3, it will be appreciated that the order of the method stages may be varied as long as at least one image is captured after a change in the image displayed on the electronic display device has been triggered.

In a variation on the examples described above, the electronic display device 102 may comprise a plurality of autonomous, self-contained pixels. Each autonomous, self-contained pixel may comprise a display element, a plurality of different sensors and a control element. Each sensor detects an external stimulus and the different sensors within an autonomous pixel may detect different external stimuli and/or have different sensing properties (e.g. the sensors may be a different physical size, shape, orientation and/or be made from a different sensing material). The control element receives a signal from one or more of the plurality of different sensors and generates a control signal based, at least in part, on a magnitude (or level) of an external stimulus as detected by the one or more of the plurality of different sensors. The control signal which is generated within the pixel by the control element is used to control the state of the display element (e.g. to control whether it is black/white or to control the color of the pixel where it is a color or greyscale display) and therefore the magnitude of the external stimulus local to the pixel determines the visual appearance of the display element (and hence the pixel). Such pixels are referred to as being autonomous because they operate independently (i.e. without requiring drive signals from central driver circuitry) and the signals which are used to control each pixel are generated locally, i.e. within the pixel itself. The external stimulus may comprise ambient signals incident upon the sensor device and/or an applied signal/stimulus which is applied in the region of the pixel itself and in various examples the different sensors within a pixel may be arranged to detect different external stimuli. Using the autonomous pixels described herein, visual information (e.g. an image or text) can be "written" directly on to a display using the external stimulus, e.g. a visible image may be rendered by applying the external stimulus (which may or may not be visible).

In an example in which the electronic display device 102 comprises a plurality of autonomous pixels, the triggering of the change in the image displayed (in block 206) may comprise a triggering of the source of the external stimulus. In examples where the ink (or other marking medium) is transparent to the external stimulus, the image displayed can be changed irrespective of whether there is marking in front of an autonomous pixel or not.

In examples where the ink (or other marking medium) is opaque to the external stimulus, however, the image displayed may only be changed where there are no annotations. Consequently, if a uniform external stimulus is applied, the resultant change to the image displayed will capture the annotations (as those pixels which are obscured by the annotations will not be updated in response to the external stimulus). In such an example, the triggering of the camera to capture an image (in block 208) may occur after the annotations have been erased by a user (or otherwise removed by a user) because the annotations have already been captured on the display.

Although the annotation capture module 106 is described above as being implemented in software (as executed by a processor), alternatively, or in addition, the functionality of the annotation capture module 106 (as described herein) may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The methods described above enable removable annotations on the surface of an electronic display device to be captured in real-time and stored and in various examples, written back to the electronic display device electronically (i.e. as part of the displayed content). The methods may be used with electronic display devices that are not touch-sensitive or do not include any digitizer technology (e.g. it may be retrofitted to existing display hardware). As the annotations are manually added to the surface of the electronic display device, there is no lag in the appearance of the annotations (which can happen when using a touch-sensitive display or a digitizer) and hence user accessibility and experience may be improved.

The system and methods described above provide a much more scalable way to capture manual annotations than using a special (e.g. active) pen that can be sensed by the electronic display device 102.

The change which is made to the displayed image (as triggered in block 206) may enable the electronic display device to enable a low power (e.g. sleep) mode during the capture operation (as triggered in block 208), thereby reducing the power consumption of the electronic display device and the system as a whole.

A first further example provides a system comprising: an electronic display device; an annotation capture module configured to trigger a change in an image displayed on the electronic display device responsive to a capture trigger; and a camera configured to capture one or more images of the electronic display device in response to the capture trigger and/or a trigger received from the annotation capture module, and wherein the annotation capture module is further arranged to identify any manual annotations made by a user on the electronic display device by analyzing the images of the electronic display device captured by the camera, wherein at least one of the images was captured after the change in the image displayed.

A second further example provides a system comprising: an electronic display means; an annotation capture module configured to trigger a change in an image displayed on the electronic display device responsive to a capture trigger; and an image capture means configured to capture one or more images of the electronic display device in response to the capture trigger and/or a trigger received from the annotation capture module, and wherein the annotation capture module is further arranged to identify any manual annotations made by a user on the electronic display means by analyzing the images of the electronic display means captured by the image capture means, wherein at least one of the images was captured after the change in the image displayed.

In the first or second further examples, the annotation capture module may be further configured to store the manual annotations.

In the first or second further examples, the annotation capture module may be further configured to identify content displayed on the electronic display device (or electronic display means) when the capture trigger was received, to add the manual annotations to the identified content to generate updated content and to store the updated content.

In the first or second further examples, the annotation capture module may be further configured to trigger the display of the updated content on the electronic display device or electronic display means.

In the first or second further examples, the annotation capture module may be further configured to trigger the camera (or image capture means) to capture an image after triggering the change in the image displayed on the electronic display device (or electronic display means).

In the first or second further examples, the system may further comprise a computing device, the computing device comprising a processor and a memory and wherein the annotation capture module comprises device-executable instructions stored in the memory that when executed by the processor cause the processor to trigger the change in the image displayed on the electronic display device (or electronic display means) responsive to a capture trigger. The annotation capture module may comprise device-executable instructions stored in the memory that when executed by the processor cause the processor to trigger display of the identified annotations on the electronic display device (or electronic display means).

In the first or second further examples, the electronic display device may be an electronic paper display device.

In the first or second further examples, the manual annotations may be hand-written annotations drawn directly onto the electronic display device.

In the first or second further examples, the manual annotations may be hand-written annotations on one or more pieces of paper that are attached onto the electronic display device.

In the first or second further examples, the manual annotations may be written using a passive writing implement that cannot be detected by the electronic display device.

In the first or second further examples, the system may further comprise a writing surface surrounding the electronic display device (or electronic display means) and wherein the camera (or image capture means) is configured to captured manual annotations that extend from the electronic display device (or electronic display means) onto the writing surface.

In the first or second further examples, the camera (or image capture means) may be sensitive to a range of non-visible wavelengths of light and comprise a flash that emits the range of non-visible wavelengths of light and wherein the manual annotations are formed in a marking medium that reflects the range of non-visible wavelengths of light in a different manner to the electronic display device (or electronic display means).

A third further example provides a method comprising: in response to receiving a capture trigger, triggering a change in an image displayed on an electronic display device and triggering capture of one or more images of the electronic display device after the change in the image displayed; and analyzing the images of the electronic display device captured by the camera to extract any manual annotations made by a user on the electronic display device.

The method of the third further example may further comprise: storing the manual annotations.

The method of the third further example may further comprise: identifying content displayed on the electronic display device when the capture trigger was received; adding the manual annotations to the identified content to generate updated content; and storing the updated content. The method of the third further example may further comprise: triggering the display of the updated content on the electronic display device.

In the method of the third further example, triggering a change in an image displayed on an electronic display device may comprise: triggering display of a pre-defined image on the electronic display device. The pre-defined image may comprise one or more of: pixels of a single color; an identification feature; an alignment feature; and a calibration feature.

A fourth further example provides a computing device comprising: a camera; a processor; and a memory arranged to store device-executable instructions which when executed by the processor, cause the processor: in response to a capture trigger, to trigger a change in an image displayed on an electronic display device and to capture one or more images of the electronic display device using the camera after the change in the image displayed; and further to analyze the captured images of the electronic display device to extract any manual annotations made by a user on the electronic display device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A system comprising:
an electronic display device displaying a first image on a screen of the electronic display device;
an annotation capture module configured to trigger changing the first image displayed on the electronic display device to a second image responsive to a capture trigger; and
a camera configured to capture an image of the electronic display device in response to the capture trigger,
and wherein the annotation capture module is further configured to:

identify annotations made by a user on an outer surface of the electronic display device based on the captured image;

separate the annotations from the second image in the captured image; and apply the annotations to an electronic version of a document.

2. The system according to claim 1, wherein the annotation capture module is further configured to store the annotations.

3. The system according to claim 1, wherein the annotation capture module is further configured to identify content in the annotations.

4. The system according to claim 3, wherein the annotation capture module is further configured to trigger the display of the electronic version of the document on the electronic display device.

5. The system according to claim 1, wherein the annotation capture module is further configured to trigger the camera to capture the image of the document.

6. The system according to claim 1, further comprising a computing device, the computing device comprising a processor and a memory and wherein the annotation capture module comprises device-executable instructions stored in the memory that when executed by the processor cause the processor to a change in an image displayed on the electronic display device responsive to a capture trigger.

7. The system according to claim 6, wherein the annotation capture module comprises device-executable instructions stored in the memory that when executed by the processor cause the processor to trigger display of the identified annotations on the electronic display device.

8. The system according to claim 1, wherein the electronic display device is an electronic paper display device.

9. The system according to claim 1, wherein the manual annotations are hand-written annotations drawn directly onto the electronic display device.

10. The system according to claim 1, wherein the manual annotations are hand-written annotations on one or more pieces of paper that are attached onto the electronic display device.

11. The system according to claim 1, wherein the manual annotations are written using a passive writing implement that cannot be detected by the electronic display device.

12. The system according to claim 1, further comprising a writing surface surrounding the electronic display device and wherein the camera is configured to captured manual annotations that extend from the electronic display device onto the writing surface.

13. The system according to claim 1, wherein the camera is sensitive to a range of non-visible wavelengths of light and comprises a flash that emits the range of non-visible wavelengths of light and wherein the manual annotations are formed in a marking medium that reflects the range of non-visible wavelengths of light in a different manner to the electronic display device.

14. A method comprising:

displaying a first image on a screen of an electronic display device;

triggering a change to the first image displayed on the electronic display device to a second image responsive to a capture trigger;

capturing an image of the electronic display device in response to the capture trigger;

identifying annotations made by a user on an outer surface of the electronic display device based on the captured image;

separating the annotations from the second image in the captured image; and applying the annotations to an electronic version of a document.

15. The method according to claim 14, further comprising:

storing the annotations.

16. The method according to claim 14, further comprising:

identifying content displayed on the electronic display device when the capture trigger was received;

adding the annotations to the identified content to generate updated content; and storing the updated content.

17. The method according to claim 16, further comprising:

triggering the display of the updated content on the electronic display device.

18. The method according to claim 14, in response to receiving a capture trigger, triggering a change in the image displayed on the electronic display device and triggering capture of one or more images of the electronic display device after the change in the image displayed.

19. The method according to claim 18, wherein the pre-defined image comprises one or more of:

pixels of a single color;

an identification feature;

an alignment feature; and a calibration feature.

20. One or more computer-readable storage devices comprising computer-executable instructions that, when executed by one or more processors, cause the one or more processors to perform the following operations:

displaying a first image on a screen of an electronic display device;

triggering a change to the first image displayed on the electronic display device to a second image responsive to a capture trigger;

capturing an image of the electronic display device in response to the capture trigger;

identifying annotations made by a user on an outer surface of the electronic display device based on the captured image;

separating the annotations from the second image in the captured image; and applying the annotations to an electronic version of a document.

* * * * *